United States Patent
Shih et al.

(10) Patent No.: US 8,331,117 B2
(45) Date of Patent: Dec. 11, 2012

(54) MULTIPLE POWER SUPPLIES BALANCE SYSTEM

(75) Inventors: Tsun-Te Shih, Taipei Hsien (TW);
Yu-Yuan Chang, Taipei Hsien (TW);
Tien-Wei Chang, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 197 days.

(21) Appl. No.: 12/850,044

(22) Filed: Aug. 4, 2010

(65) Prior Publication Data
US 2012/0033450 A1   Feb. 9, 2012

(51) Int. Cl.
*H02J 1/14* (2006.01)
*G05F 1/635* (2006.01)
(52) U.S. Cl. .............................. 363/65; 323/298; 307/58
(58) Field of Classification Search .................... 363/65, 363/67, 71; 307/52, 53, 58, 82; 323/293, 323/294, 298, 352, 353, 354
See application file for complete search history.

(56) References Cited

U.S. PATENT DOCUMENTS

| | | | | |
|---|---|---|---|---|
| 4,618,779 A | * | 10/1986 | Wiscombe | 307/60 |
| 7,425,779 B2 | | 9/2008 | Luo et al. | |
| 7,739,525 B2 | | 6/2010 | Bird | |
| 8,084,885 B1 | * | 12/2011 | Zansky et al. | 307/60 |

* cited by examiner

*Primary Examiner* — Gary L Laxton
(74) *Attorney, Agent, or Firm* — Muncy, Geissler, Olds & Lowe, PLLC

(57) ABSTRACT

A multiple power supplies balance system includes a plurality of power supply circuits on a circuit board each having a power output route. Each power supply circuit includes a power supply feedback unit which has a reference level terminal to determine output potential of the power supply circuit. The circuit board also has an output route electrically connected to the power output route to converge current sending to a load. Thus the circuit board contains multiple sets of power supply circuits coupled in parallel. The circuit board also has a proportion distribution circuit to correct output variations of each power supply circuit. The proportion distribution circuit includes a variable impedance element which is electrically connected to the reference level terminals and controllable to proportionally change equivalent impedance connected to each reference level terminal, thus change proportionally output potential of each power supply circuit.

7 Claims, 3 Drawing Sheets

US 8,331,117 B2

MULTIPLE POWER SUPPLIES BALANCE SYSTEM

FIELD OF THE INVENTION

The present invention relates to a multiple power supplies balance system and particularly to a system to regulate output ratio of multiple power supply circuits through a proportion distribution circuit.

BACKGROUND OF THE INVENTION

Unstable power supply could cause abnormal system shutdown or data damage during operation of computer equipment, and in serious situations the equipment could be damaged and enormous loss could occur. To prevent such a situation, the computer equipment could be equipped with multiple power supplies to form a redundant power supply system. The redundant power supply system includes two or more power supplies and a back panel. Each power supply provides an output power. The back panel is connected with the power supplies to integrate all output power to drive a load connected to the redundant power supply system. In the event that one of the power supplies malfunctions and an abnormal output occurs, other power supplies share the power needed on the load, and a normal power supply displaces the malfunctioned power supply. Or in the event that the other power supplies have extra power capacity, their output power can be increased temporarily to provide the extra power to the load.

A conventional redundant power supply system, referring to FIG. 1, with two sets of power supplies 1 coupled on a back panel 91 is taken as an example that are connected to a power source 90 to get an input power. The input power passes through a first rectification unit 11 and a power factor correction unit 12 of the power supply 1, and is regulated by at least one power switch 14 controlled by a pulse width control unit 15 and a transformer 13, and passes through a second rectification unit 16 at the secondary side of the transformer 13 to be output to the back panel 91. In order to balance the current output by the two power supplies 1 to the back panel 91, the second rectification unit 16 is coupled at a rear end thereof with a diode 17 to prevent backflow of the current and a current balance unit 18. The current balance unit 18 is connected to the back panel 91. The back panel 91 has a circuit to couple a plurality of current balance units 18. In the event that output currents of the power supplies 1 are unbalance, the current balance unit 18 provides a feedback signal to a power supply feedback unit 19 to provide feedback and regulate output of the pulse width control unit 15, thereby maintain the balance of the output current from the two power supplies 1.

U.S. Pat. No. 7,739,525 discloses a multiple power supplies system with each power supply providing a hot-swappable function. In its FIG. 1, a plurality of power supplies 12a-12d are connected to a current control feedback device 15 in parallel, and include current sensors 20 to regulate output.

U.S. Pat. No. 7,425,779 provides a similar technique with a back panel coupled with a plurality of power supplies to form a redundant power supply system equipped with fault tolerance function.

However, a system to accommodate multiple sets of power supplies and a back panel is costly and bulky, and such a large redundant power supply becomes a waste to a smaller electronic system. In the conventional technique, if multiple sets of power supplies are not integrated through a back panel, output voltages will be slightly different because of small variations of elements even if the specifications of the power supplies are exactly the same. Unbalance of voltage and current will cause the power supply with a higher output voltage be heavily loaded. Such a phenomenon will notably affect the lifespan of the power supply. Integrating multiple sets of power supplies creates difficulty in control of output balance of the power supplies. Thus there is a dilemma in the design of the redundant power supply system in terms of cost and stability.

SUMMARY OF THE INVENTION

In view of element error of power supply will cause output voltage variations, and parallel coupled power supplies without using a back panel will result in output unbalance and shortened lifespan, the primary object of the present invention is to provide a system with multiple power supply circuits coupled in parallel. It also includes a proportion distribution circuit for adjustment. Through the proportion distribution circuit, the output ratio of multiple power supply circuits can be regulated to reduce output errors resulted from fabrication of each power supply circuit. Thus the power supply circuits can achieve output balance without relying on the control of a back panel.

The present invention provides a multiple power supplies balance system with multiple sets of power supply circuits located on a circuit board and each power supply circuit has a power output route. Each power supply circuit includes a power supply feedback unit which has a reference level terminal to determine the output potential of the power supply circuit. The circuit board further has an output route electrically connected to the power output route to converge current output to a load. Hence the circuit board contains a plurality of power supply circuits coupled in parallel. In order to correct output errors of each power supply circuit, the circuit board further has a proportion distribution circuit which includes a variable impedance element electrically connected to the reference level terminal. The impedance element is controllable to proportionally change equivalent impedance connected to each reference level terminal, thus can change output potential of each power supply circuit in proportion.

In short, the multiple power supplies balance system of the invention provides multiple sets of power supply circuits coupled in parallel to achieve mutual backup effect. The proportion distribution circuit can regulate output ratio of the power supply circuits in advance to reduce output errors of the power supply circuits and achieve output balance without relying on coordination of a back panel.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
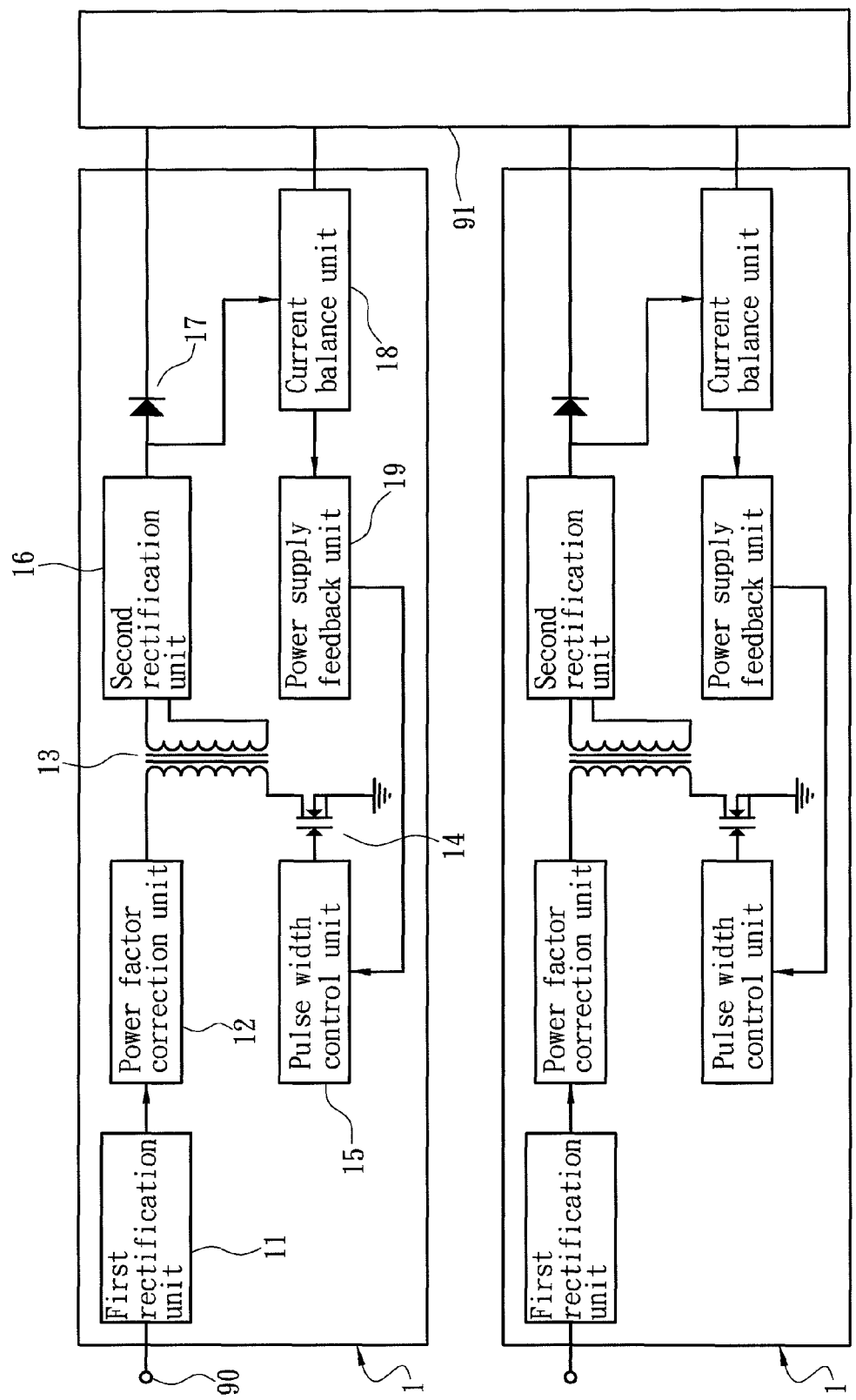
FIG. 1 is a circuit block diagram of a conventional technique.
Figure 2:
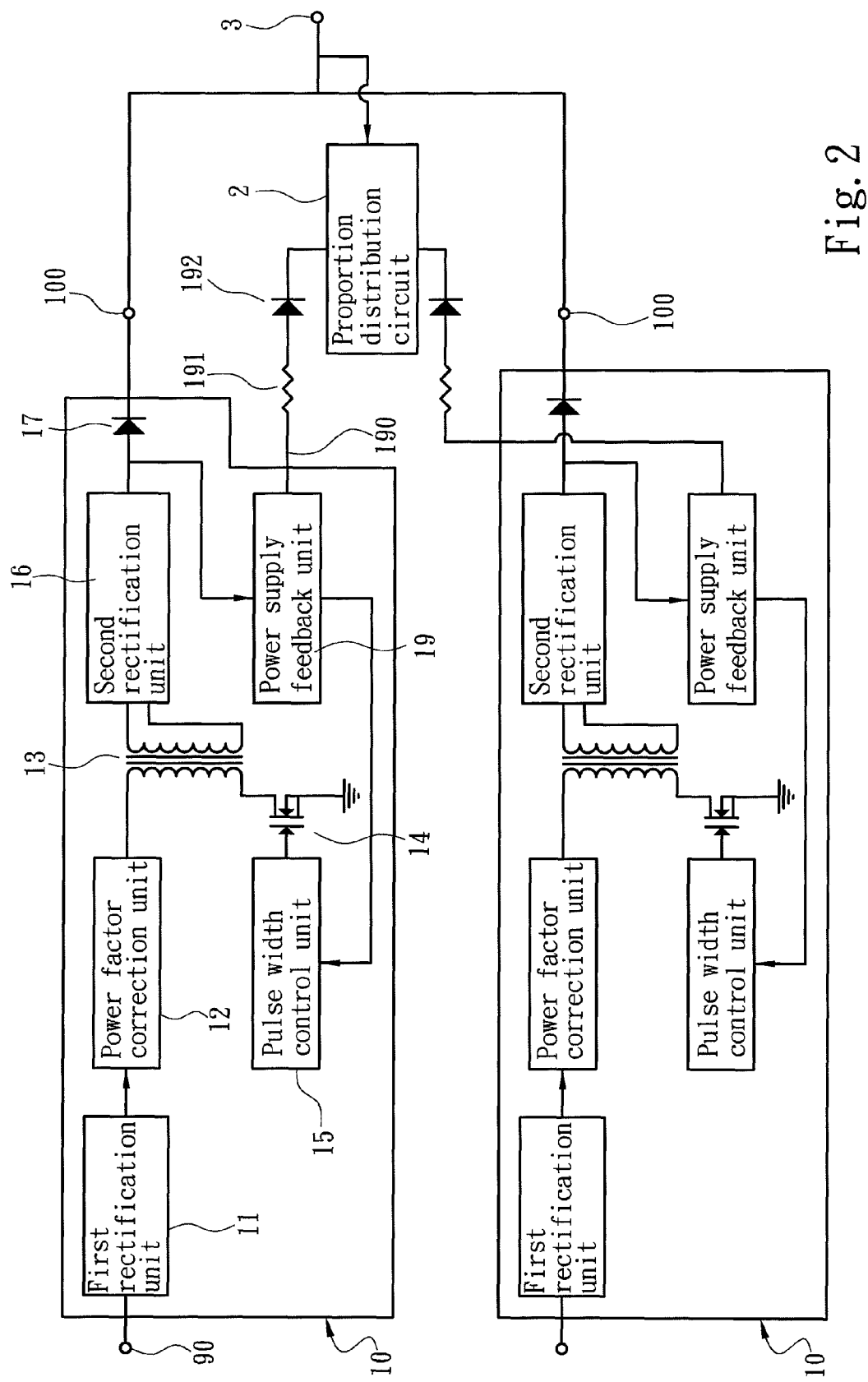
FIG. 2 is a circuit block diagram of the invention.

The present invention provides a multiple power supplies balance system. Please refer to FIG. 2, the system includes a circuit board containing a plurality of power supply circuits 10 each having a power output route 100. With the power supply circuits 10 are formed on the same circuit board, it is different from the conventional technique that independent power supplies are coupled on a back panel in a swappable manner. Refer to FIG. 2 for an embodiment. The circuit board includes two sets of power supply circuits 10. Each power supply circuit 10 comprises a first rectification unit 11, a power factor correction unit 12, a transformer 13, at least one power switch 14 connected to the primary side of the transformer 13 and a pulse width control unit 15 for deciding a switch time series to drive the power switch 14. The first rectification unit 11 receives an input power from a power source 90. The input power is modulated by the first rectification unit 11 and power factor correction unit 12, and regulated by the power switch 14 controlled by the pulse width control unit 15 to pass through the transformer 13. The power output route 100 is located at the secondary side of the transformer 13 that inducts the power passing through a second rectification unit 16 and a diode 17 to become an output power of the power supply circuit 10. Also referring to FIG. 1, the two power supply circuits 10 providing the output power to the power output route 100 is a well known power modulation technique. The circuit board further includes an output route 3 electrically connected to the power output route 100 to converge current to output to a load. In order to control output power of the power supply circuit 10, the power supply circuit 10 further includes a power supply feedback unit 19 which outputs a feedback signal to the pulse width control unit 15 to regulate the switch time series of the power switch 14. The feedback signal of the power supply feedback unit 19 changes the output power provided by the power supply circuit 10. The power supply feedback unit 19 has an output feedback end electrically connected to the power output route 100. Based on the power detected at the output feedback end, the value of the feedback signal can be changed.

Even if the specifications of the two power supply circuits 10 are the same, element errors between them can generate output differences. Hence the invention provides a reference level terminal 190 on the power supply feedback unit 19 to determine output potential of the power supply circuits 10. The circuit board includes a proportion distribution circuit 2. All the reference level terminals 190 of the power supply circuits 10 are connected to the proportion distribution circuit 2. Each reference level terminal 190 and the proportion distribution circuit 2 also are bridged by a resistor 191 and a diode 192. The reference level terminal 190 allows current to pass through only one way. The proportion distribution circuit 2 has a variable impedance element electrically connected to the reference level terminals 190. The impedance element is controllable to change proportionally equivalent impedance connected to the reference level terminal 190 so that while the impedance element changes, the equivalent impedance connected to the reference level terminal 190 also is changed in proportion at the same time. Therefore, different equivalent impedance connected to different reference level terminals 190 allows each power supply feedback unit 19 to drive the power supply circuit 10 to generate different output potential. For such a design of the invention, even the specification of each power supply circuit 10 is the same, the output power and voltage still have slight differences under the element errors. Through the proportion distribution circuit 2, the equivalent impedance connected to the reference level terminal 190 can be adjusted to change proportionally output potential of each power supply circuit 10.

By means of the aforesaid technique, the two power supply circuits 10 shown in FIG. 2 can be integrated on the same circuit board, and output variations of the two power supply circuits 10 can be reduced to minimum through the proportion distribution circuit 2 before leaving from the plant. Thus output balance of the two power supply circuits 10 is achieved without relying on coordination of the back panel.

Figure 3:
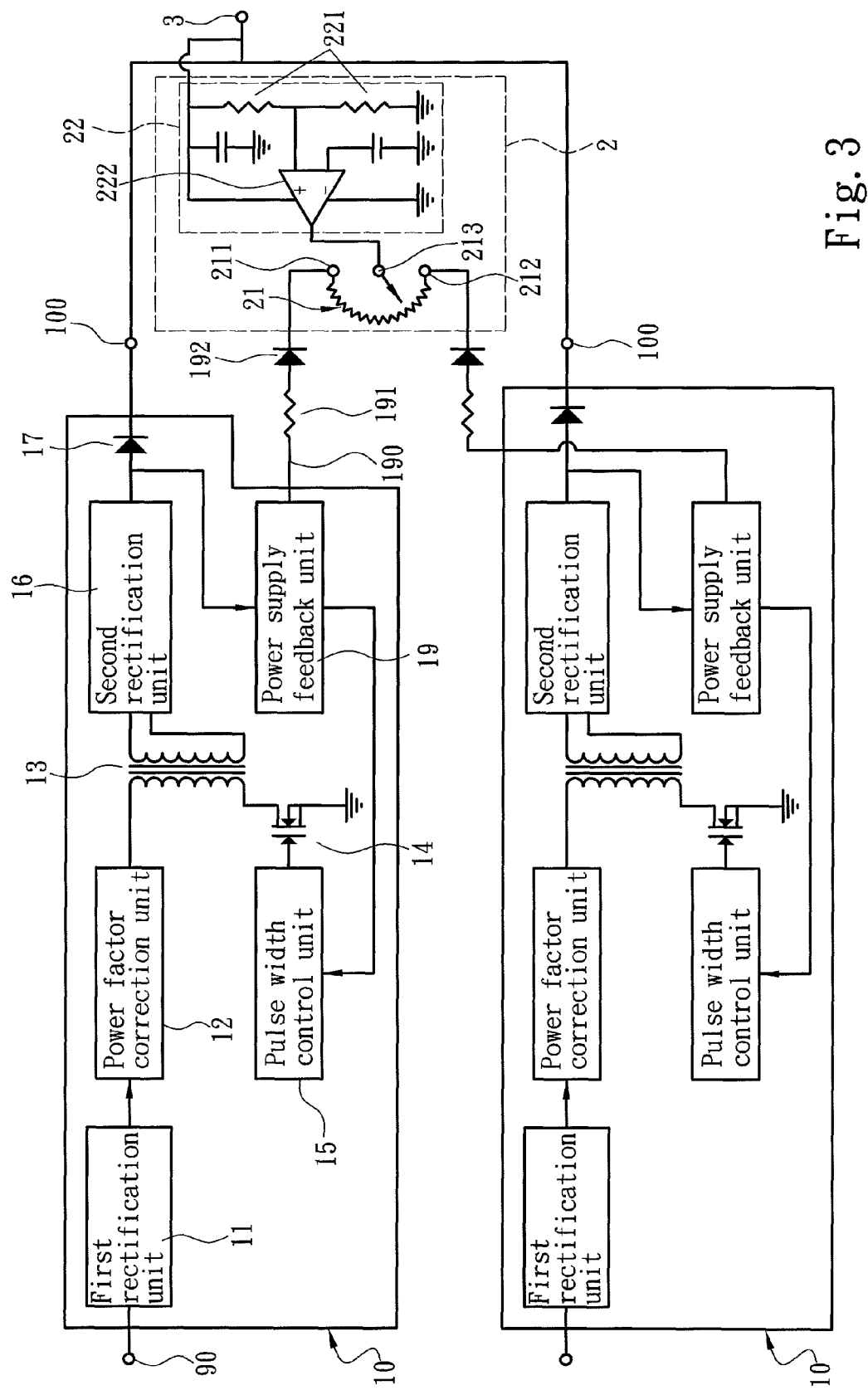
FIG. 3 is a schematic view of an embodiment of the proportion distribution circuit of the invention.

Refer to FIG. 3 for an embodiment of the proportion distribution circuit. In addition to the variable impedance element, the proportion distribution circuit 2 further includes an output feedback unit 22 electrically connected to the impedance element. The variable impedance element can be a general variable resistor 21 incorporated with the reference level terminals 190 of the two power supply circuits 10, and can be formed in a type containing a first end 211, a second end 212 and a movable end 213. The first end 211 and second end 212 are connected to different reference level terminals 190. Where the movable end 213 positioned is used to divide a variable resistance zone to first internal resistance and second internal resistance that vary in inverse proportion. The first internal resistance is the impedance between the first end 211 and the movable end 213, and the second internal resistance is the impedance between the second end 212 and the movable end 213. The first internal resistance and second internal resistance respectively have one end (i.e. first end 211 and second end 212) connected to different reference level terminals 190, and another end (i.e. movable end 213) connected to the output feedback unit 22. The output feedback unit 22 includes a plurality of voltage dividing resistors 221 and an operational amplifier 222. The voltage dividing resistors 221 are connected to the output route 3 to provide a divided voltage to the operational amplifier 222. The operational amplifier 222 gets the divided voltage of the voltage dividing resistors 221 and converts the divided voltage to a voltage signal. The operational amplifier 222 determines the value of the voltage signal through the divided voltage. As shown in FIG. 3, the voltage signal output from the operational amplifier 222 is set lower than the reference level terminal 190. Current flowing on the reference level terminal 190 follows the conduction direction of the diode 192. Of course, the voltage of the operational amplifier 222 can also be set higher than the reference level terminal 190, then the connecting direction of the diode 192 is reverse of the one shown in FIG. 3. The voltage signal makes each reference level terminal 190 to generate current, and the power supply feedback unit 19 determines output potential of the power supply circuit 10 based on the current value at the reference level terminal 190.

The variable resistor 21 aims to achieve output balance between the power supply circuits 10. Once is achieved the output balance of the two power supply circuits 10, the variable resistor 21 further needs to be incorporated with the output feedback unit 22 to achieve reference level correction function at the same time. In operation of the multiple power supplies balance system, the output feedback unit 22 detects power delivered from the output route 3 to the load. In the event that the power delivered to the load fluctuates, the voltage signal output from the operational amplifier 222 generates variation correspondingly, and the current generated from the voltage signal flows through the variable resistor 21, resistor 191 and diode 192. As the two power supply circuits 10 have been adjusted and balanced when leaving the plant, the variable resistor 21 remains unchanged and is in effect the same as the different reference level terminals 190 respectively connected to the first internal resistance and second internal resistance. The voltage signal causes the reference level terminal 190 to generate current so that the two power supply feedback units 19 are triggered respectively by different currents of the two reference level terminals 190 to regulate output potential of the two power supply circuits 10. In the event that impedance proportion of the variable resistor 21 is unchanged, the output potential of the power supply circuits 10 is changed at the same time and same ratio. For instance, with the variable resistor 21 remained unchanged, the output voltage ratio of the two power supply circuits 10 also is unchanged. When output voltage of the output route 3 drops, the two power supply circuits 10 increase output at the same time and same ratio to increase the voltage output from the output route 3 through the voltage signal generated by the output feedback unit 22.

By means of the technique previously discussed, the two power supply circuits 10 can be integrated on the same circuit board and minimize output variations of the two power supply circuits 10 through the proportion distribution circuit 2 without relying on a back panel to coordinate output balance of the two power supply circuits 10.

While the invention has been described by means of specific embodiments, numerous modifications and variations could be made thereto by those skilled in the art without departing from the scope and spirit of the invention set forth in the claims.

In summation of the above description, the present invention provides a significant improvement over the conventional techniques and complies with the patent application requirements, and is submitted for review and granting of the commensurate patent rights.

What is claimed is:

1. A balance system for multiple power supplies located on a circuit board, comprising:
   a plurality of power supply circuits each including a first power output route and a power supply feedback unit, the power supply feedback unit including a reference level terminal to determine output potential of one of the plurality of power supply circuits;
   a second output route electrically connected to the first power output route of each of the plurality of power supply circuits to converge current sending to a load;
   a proportion distribution circuit which includes a variable impedance element electrically connected to the reference level terminals, and an output feedback unit respectively connected to the variable impedance element and the second output route; and
      wherein the variable impedance element is controllable to change proportionally equivalent impedance connected to the reference level terminals, and wherein the output feedback unit detects the current from the second output route to generate a voltage signal which causes the reference level terminals to generate currents, the power supply feedback unit being triggered respectively by the currents to change the output potential of each of the plurality of the power supply circuit at the same time and same ratio.

2. The multiple power supplies balance system of claim 1, wherein the circuit board includes two sets of the plurality of power supply circuits.

3. The multiple power supplies balance system of claim 1, wherein the output feedback unit includes an operational amplifier to output the voltage signal, the second output route being connected to a plurality of voltage dividing resistors to provide the divided voltage to the operational amplifier which determines the value of the voltage signal according to the divided voltage.

4. The multiple power supplies balance system of claim 1, wherein the impedance element is a variable resistor.

5. The multiple power supplies balance system of claim 4, wherein the variable resistor includes a first internal resistance and a second internal resistance that change in a reverse proportion, the first and second internal resistances being connected to different reference level terminals and including other ends connected to the output feedback unit.

6. The multiple power supplies balance system of claim 1, wherein each of the plurality of power supply circuits includes a transformer, at least one power switch connected to a primary side of the transformer and a pulse width control unit to decide a switch time series to drive the power switch, the first power output route of each of the plurality of power supply circuits being located at a secondary side of the transformer, the power supply feedback unit sending a feedback signal to the pulse width control unit to regulate and drive the switch time series of the power switch.

7. The multiple power supplies balance system of claim 6, wherein power supply feedback unit includes an output feedback end electrically connected to the secondary side of the transformer and changes the value of the feedback signal according to power detected at the output feedback end.

* * * * *